United States Patent [19]
Cloutier

[11] Patent Number: 5,892,962
[45] Date of Patent: Apr. 6, 1999

[54] FPGA-BASED PROCESSOR

[75] Inventor: Jocelyn Cloutier, North Brunswick, N.J.

[73] Assignee: Lucent Technologies Inc., Murray Hill, N.J.

[21] Appl. No.: 748,041

[22] Filed: Nov. 12, 1996

[51] Int. Cl.[6] .................................................. G06F 15/00
[52] U.S. Cl. .............................. 395/800.16; 395/800.11; 395/800.1; 395/800.22
[58] Field of Search .................... 395/800.12, 800.16, 395/800.22, 800.11, 800.1, 800.2

[56] References Cited

U.S. PATENT DOCUMENTS

| | | | |
|---|---|---|---|
| 5,512,765 | 4/1996 | Gaverick | 257/202 |
| 5,535,406 | 7/1996 | Kolchinsky | 395/800 |
| 5,611,038 | 3/1997 | Shaw et al. | 395/806 |
| 5,640,106 | 6/1997 | Erickson et al. | 326/38 |
| 5,640,107 | 6/1997 | Kruse | 326/38 |
| 5,692,147 | 11/1997 | Larsen et al. | 395/412 |

OTHER PUBLICATIONS

"The REMAP Massively Parallel Computer Platform for Neural Computations", by Lars Bengtsson et al., Proceedings of the Third International Conference on Microelectronics for Neural Networks, 6–8 Apr. 1993 Edinburgh, Scotland UK, pp. 47–62.

"Automatic Synthesis of Neural Networks to Programmable Hardware", by S. Gick, P. Heusinger and A. Reuter, Proceedings of the Third International Conference on Microelectronics for Neural Networks, 6–8 Apr. 1993 Edinburgh, Scotland UK, pp. 115–120.

"Fuzzy Associative Memory by means FPGA's", Mario Reyes de los Mozos and Elena Valderrama, Proceedings of the Fourth International Conference on Microelectronics for Neural Networks and Fuzzy Systems, Sep. 26–28, 1994, Turin, Italy, 1994 IEEE, pp. 301–307.

"RAN$^2$-SOM: A Reconfigurable Neural Network Architecture Based on Bit Stream Arithmetic", by Michael Gschwind, Valentina Salapura, Oliver Maischberger, Proceedings of the Fourth Int'l. Conference on Microelectronics for Neural Networks and Fuzzy Systems, Sep. 26–28, 1994, Turin, Italy, 1994 IEEE, pp. 294–300.

"Fuzzy Interpretable Dynamically Developing Neural Networks with FPGA Based Implementation", by S.K. Halgamuge, et al., Proceedings of the Fourth Int'l. Conference on Microelectronics for Neural Networks and Fuzzy Systems, Sep. 26–28, 1994, Turin, Italy, 1994 IEEE, pp. 226–234.

"Cost–performance analysis of FPGA, VLSI and WSI implementations of a RAM–based neural network", by Paul Morgan et al., Proceedings of the Fourth Int'l. Conference on Microelectronics for Neural Networks and Fuzzy Systems, Sep. 26–28, 1994, Turin, Italy, 1994 IEEE, pp. 235–243.

"Fast Prototyping of Artificial Neural Network: GSN Digital Implementation", by Eduardo fo Valle Simões, et al., Proceedings of the Fourth Int'l. Conference on Microelectronics for Neural Networks and Fuzzy Systems, Sep. 26–28, 1994, Turin, Italy, 1994 IEEE, pp. 192–201.

*Primary Examiner*—Eric Coleman
*Assistant Examiner*—Mackly Monestime

[57] ABSTRACT

A multiprocessor having an input/output controller, a process controller, and a multidimensional arrays of field programmable gate arrays (FPGAs), each FPGA having its own local memory. The multiprocessor may be programmed to function as a single-instruction, multiple-data (SIMD) parallel processor having a matrix of processing elements (PEs), where each FPGA may be programmed to operate as a submatrix array of PEs. The multiprocessor is especially useful for image processing, pattern recognition, and neural network applications.

35 Claims, 3 Drawing Sheets

FPGA-BASED PROCESSOR

BACKGROUND OF THE INVENTION

1. Field of the Invention

The present invention relates to computer architecture for parallel processors.

2. Description of the Related Art

Even with the last decade's exponential growth in performance of integrated circuits, many high performance applications, such as image processing and neural network applications, still demand increased hardware speed. One approach to increase performance is to build massively parallel computers. Their high price and difficulty to program have resulted in a very low acceptance rate. Furthermore, the design cycle of such computers is usually long, and, as a result, their technology is often obsolete before they are commercially available. Consequently, users often prefer to use the latest high-performance general workstation that is much less expensive and more easy to program. A second approach to solving the performance problem is to design dedicated parallel hardware for one task (or a set of similar tasks). Their programming is usually simple (or even nonexistent) while their performance/cost ratio is high. However, they are not flexible and their design cycle is long.

Over the last few years, advances in programmable logic devices have resulted in the commercialization of field programmable gate arrays (FPGAs) which are able to support relatively large numbers of programmable logic elements on a single chip. The size and speed of those circuits improve at the same rate as microprocessors' size and speed, since they rely on the same technology.

It is an aspect of the present invention to provide improved apparatus for data processing applications requiring a large number of operations, such as image processing, pattern recognition, and neural network algorithms.

It is another aspect to provide apparatus for data processing which provides greater flexibility and shorter design cycle than existing parallel processors.

A further aspect is to provide a more economical apparatus and process for virtual image processing (VIP) and neural network processing.

Further aspects and advantages of this invention will become apparent from the detailed description which follows.

SUMMARY OF THE INVENTION

In one embodiment, the present invention is a multiprocessor comprising a multidimensional array of FPGAs, each FPGA having local memory; a process controller, connected to the array of FPGAs; and an input/output (I/O) controller, connected to the array of FPGAs and to the process controller. The array of FPGAs is adapted to be programmed as one or more processing elements (PEs), the process controller is adapted to control processing implemented by the PEs, and the I/O controller is adapted to control data flow into and out of the PEs and the process controller.

In another embodiment, the invention is a multiprocessor comprising a first FPGA and one or more other FPGAs, connected to the first FPGA. The first FPGA is adapted to be programmed to function exclusively as a process controller for the one or more other FPGAs and the one or more other FPGAs are adapted to be programmed to function exclusively as processing elements.

DETAILED DESCRIPTION

In one embodiment, the multiprocessor of the present invention is based on a multidimensional array of field programmable gate arrays (FPGAs) adapted to be programmed to function as one or more processing elements (PEs). Each FPGA in the array preferably has its own local memory and can be programmed to use the same local-memory addresses as the other FPGAs in the array.

In a one-dimensional array of FPGAs, each FPGA is connected to either one or two neighboring FPGAs. In a one-dimensional torroidal array, each FPGA is connected to exactly two neighboring FPGAs. If, in an array of FPGAs, at least one FPGA is connected to at least three neighboring FPGAs, then that array is said to be a multidimensional array (that is, an array of dimension greater than one). In a two-dimensional torroidal array, for example, each FPGA is connected to four neighboring FPGAs. A multidimensional array may have more than two dimensions.

Figure 1:
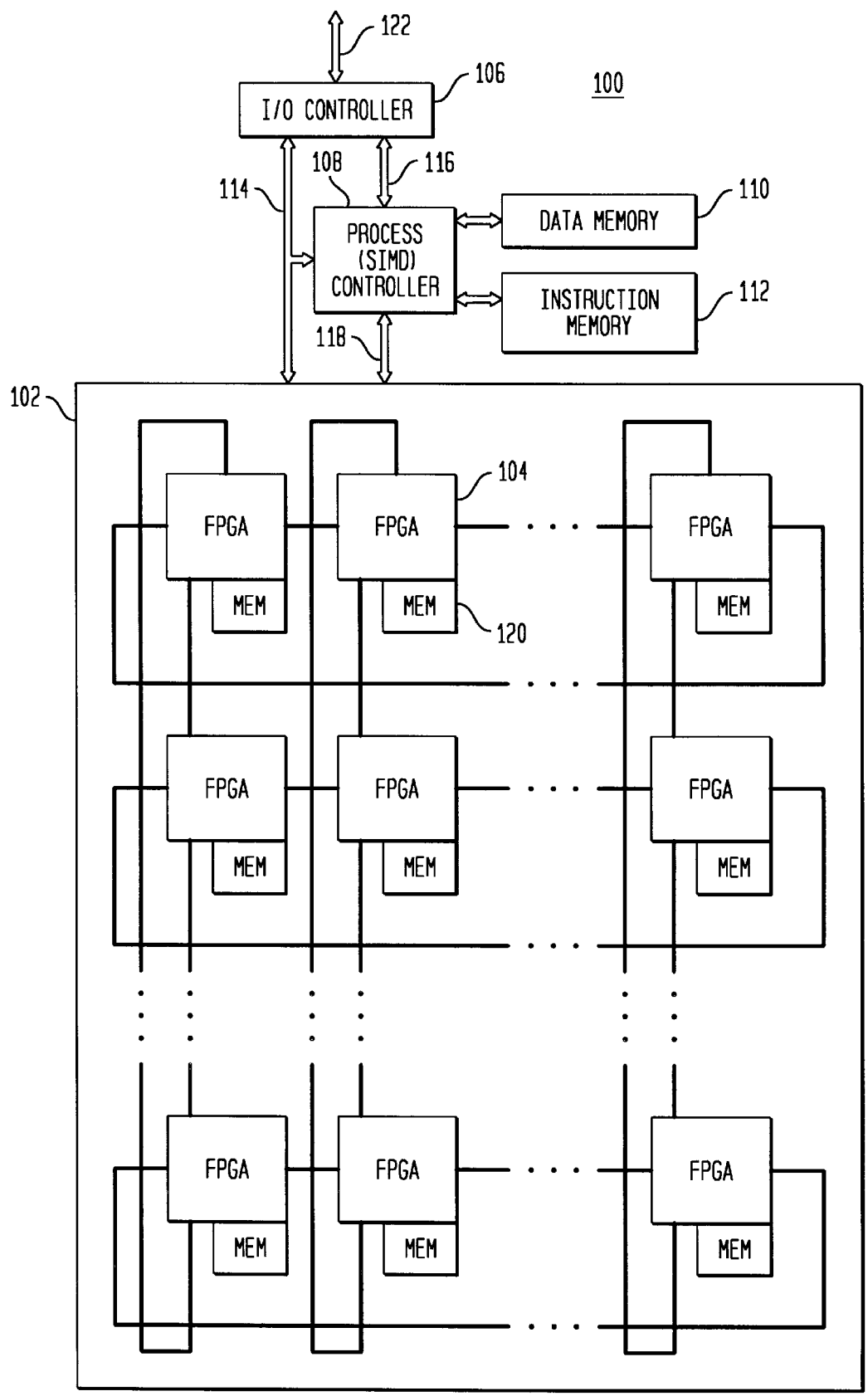
FIG. 1 is a schematic block diagram of a multiprocessor, according to one embodiment of the invention.

Referring now to FIG. 1, there is shown a schematic block diagram of multiprocessor 100, according to one embodiment of the present invention. Multiprocessor 100 comprises two-dimensional (2D) array 102 of FPGAs 104 (each with its own local memory 120), input/output (I/O) controller 106, and process controller 108 having data memory 110 and instruction memory 112. Process controller 108 is preferably an FPGA that is not part of array 102. Memories 110 and 112 are independently addressable by process controller 108. I/O controller 106, process controller 108, and array 102 are interconnected by global bus 114. Similarly, I/O controller 106 and process controller 108 are interconnected by I/O control bus 116, and process controller 108 and array 102 are interconnected by program control bus 118. I/O controller 106 may also be connected to a computer host by host system bus 122, which may be, for example, a peripheral control interface (PCI) bus.

Figure 2:
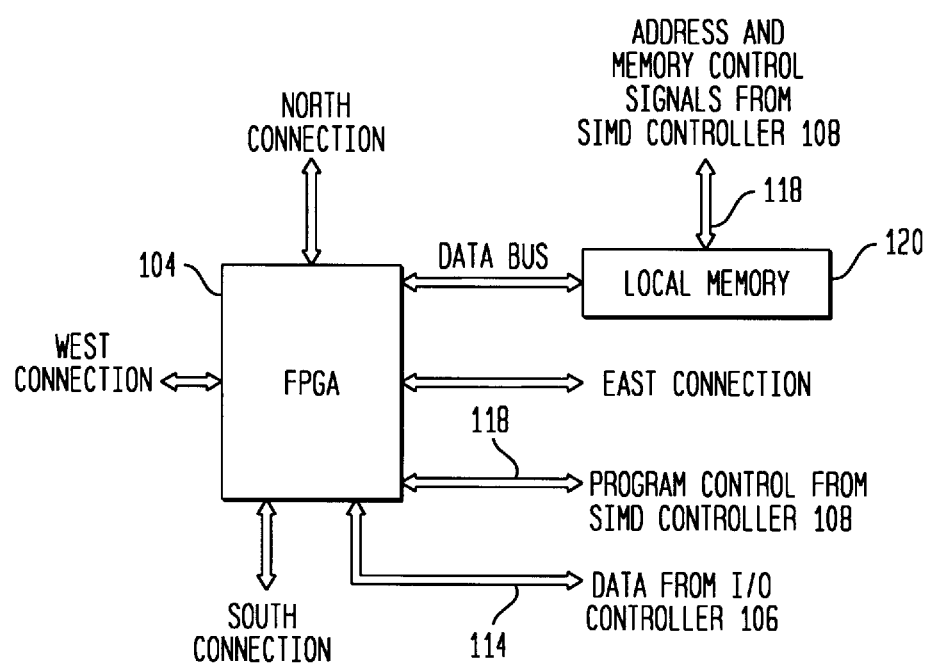
FIG. 2 is a schematic block diagram of an FPGA of the multiprocessor of FIG. 1.

Referring now to FIG. 2, there is shown a schematic block diagram of each FPGA 104 in array 102 of FIG. 1. As shown in FIGS. 1 and 2, each FPGA 104 is connected in the north (N), south (S), east (E), and west (W) directions to its four neighboring FPGAs in a torroidal fashion. A torroidal connection scheme means that each FPGA in the first column is connected to the corresponding FPGA in the last column (in the E-W direction) and each FPGA in the first row is connected to the corresponding FPGA in the last row (in the N-S direction). Each FPGA 104 has local memory 120, which is preferably static random access memory (SRAM) based. Each FPGA 104 is either one-time programmable or reprogrammable. Each FPGA 104 in array 102 is capable of receiving program control data from process controller 108 via program control bus 118 and other data from I/O controller 106 via global bus 114. Similarly, process controller 108 is able to access each local memory 120 directly via either program control bus 118 or global bus 114.

Since it is based on FPGAs which are programmable devices, multiprocessor 100 provides a flexible computer architecture that can be programmed in a wide variety of ways to perform a wide variety of applications. In particular, multiprocessor 100 is especially suited to be programmed to function as a parallel processor. For example, array 102 of FPGAs 104 can be programmed to function as a matrix of processing elements (PEs), where the various PEs perform the same operations on different data in parallel. In that case, multiprocessor 100 will operate as a single-instruction, multiple-data (SIMD) processor. Depending on the application, each PE may correspond to one or more programmed FPGAs, or, alternatively, each FPGA may be programmed to operate as one or more PEs. Similarly, multiprocessor 100 could alternatively be programmed to operate as a multiple-instruction, multiple-data (MIMD) or multiple-instruction, single-data (MISD) processor. It is even possible to program multiprocessor 100 to operate as a single-instruction, single-data (SISD) processor, also known as a serial processor.

Figure 3:
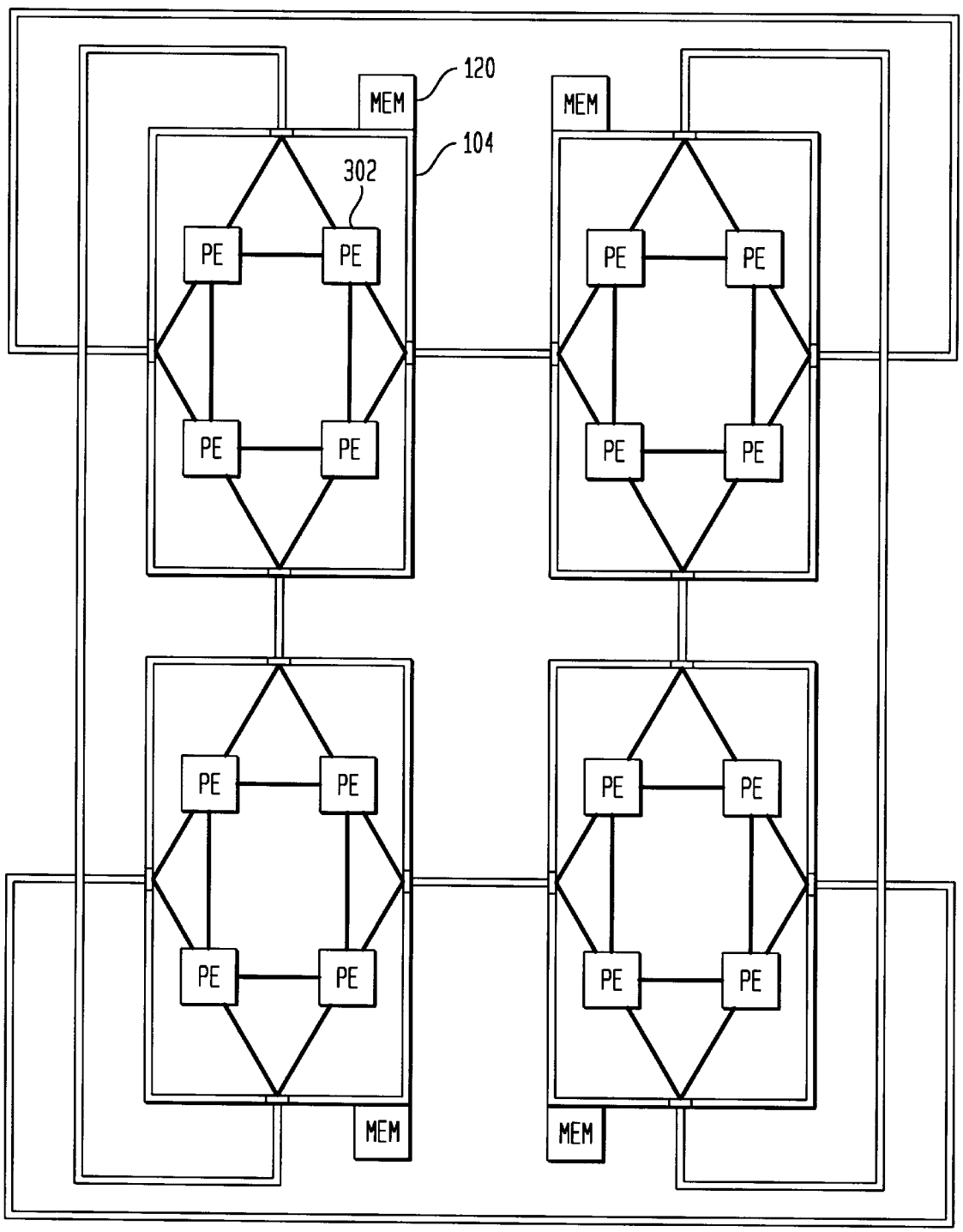
FIG. 3 is a schematic block diagram of a 2D configuration of FPGAs on which 2D configurations of PEs are programmed, according to one embodiment of the present invention.

Referring now to FIG. 3, there is shown an example of a (2×2) 2D array 102 of FPGAs 104 programmed to operate as a (4×4) matrix of PEs 302. Each FPGA 104 is programmed to function as a (2×2) submatrix of PEs 302, where the four PEs 302 corresponding to each FPGA 104 access the same local memory 120. In one embodiment, each FPGA 104 is programmed to use the same local-memory addresses for accessing each local memory 120.

Referring again to FIG. 1, when multiprocessor 100 is programmed to operate as a SIMD processor, process controller 108 is programmed to function as a SIMD controller that controls the parallel processing performed by the PEs. Process controller 108 is able to store global data in data memory 110 and programming instructions in instruction memory 112. Multiprocessor 100 can be programmed such that the PEs are used exclusively for computing operations, while process controller 108 is programmed exclusively for program control operations.

Process controller 108 can be programmed to provide addresses and control to every memory during program execution and input/output (I/O) memory transfers. Process controller 108 is preferably either a one-time programmable or reprogrammable FPGA. Process controller 108 decodes and executes the program stored in instruction memory 112, and reads or writes to data memory 110. Process controller 108 is the control unit. It reads a program from instruction memory 112 and uses data memory 110 for storing global information. Once an instruction is decoded, process controller 108 sends data and control signals to the PEs through global bus 114 and dedicated program control bus 118. Global bus 114 may be used to send both control and data signals. Process controller 108 also provides addresses and control to every memory during both program execution and I/O memory transfers. If configured accordingly, it exchanges status information with I/O controller 106.

In one embodiment, input/output controller 106 is adapted to control data flow into and out of the PEs via global bus 114 and process controller 108 via I/O control bus 116. I/O controller 106 is also adapted to exchange status information with process controller 108 and to manage data transfer from and to a host computer (not shown). In one embodiment, I/O controller 106 has an electrically programmable read only memory (EPROM). In its role of managing off-board communication and initiating memory transfers, I/O controller 106 is responsible for communicating with the host computer, exchanging status information with process controller 108; and managing data transfer between the host computer and the board (i.e., multiprocessor 100).

Global bus 114 is adapted to support data transfer between the array of FPGAs 104, process controller 108, and I/O controller 106. In most cases, the global bus is adapted to carry both control and data signals. Data transfers between the host computer and the board use global bus 114 to send address and data to the PEs and process controller 108. I/O control bus 116 is adapted to support data transfer between I/O controller 106 and process controller 108. Program control bus 118 is adapted to support data transfer between process controller 108 and the array of FPGAs 104.

In addition, multiprocessor 100 includes a programmable clock signal based on two different clock signals, one of which clock signals is from host system bus 122 and the second of which clock signals is from a crystal clock (not shown).

Multiprocessor 100 can be configured with one or more other such multiprocessors 100 to form a large, more powerful parallel processing architecture. For example, four multiprocessors 100 can be configured in a (2×2) array to form an augmented multidimensional array of FPGAs. In one embodiment, the different multiprocessors 100 would have matching PCI bus clocks provided by matching PCI bus controllers.

The SIMD architecture of the present invention, together with the multidimensional torus connection topology, is well suited for image processing, pattern recognition, and neural network algorithms. Multiprocessors of the present invention can be programmed on-line at the logic level, allowing optimal hardware dedication to any given algorithm. For example, multiprocessor 100 can be programmed with an optical character recognition algorithm functioning to receive data from an optical scanner in the form of pixels and to output character recognition data. Those and other algorithms generally include at least one of matrix multiplication, matrix addition, vector multiplication, vector addition, convolution, neural network forward pass, and neural network learning.

One of the most efficient and cost-effective architectures for parallel vector and matrix processing is the 2D systolic architecture. See, e.g., J. Beichter, U. Ramacher, and H. Klar, "VLSI design of a neural signal processor," *Silicon Architectures for Neural Nets*, pp 245–260, Elsevier Science Publishers B. V. (North-Holland), 1991; D. Mammerstrom, "Image processing and pattern recognition hardware," Tutorial at Neural Information Processing Systems conference, November 1994; P. Ienne, "Architectures for neurocomputers: Review and performance evaluation," Technical Report 93/91, École polytechnique fédérale de Lausanne, January 1993; and H. Kung and C. Leiserson, "Systolic arrays (for VLSI)," *Sparse Matrix Proceedings* (I. S. Duff and G. Stewart, editors), Knoxville: Academic Press, 1979, the teachings of all of which are incorporated herein by reference. However, this architecture is somewhat restrictive for more general applications. According to one embodiment of the present invention, a SIMD architecture together with a 2D torus connection topology, which includes the 2D systolic architecture, is used. Drawbacks in such an architecture due to rigid data flow are overcome by the configurability of the FPGAs. Multiprocessors of the present invention may be programmed for efficient computation of basic matrix and vector operations such as 1D and 2D convolutions, matrix multiplication, matrix addition, matrix-vector multiplication, scalar multiplication, vector addition, and the like.

Multiprocessor 100 of the present invention can be programmed, for example, as a virtual image processor (VIP). An example is a VIP board that uses 5 large FPGAs, has 1.5 MB of static RAM, and communicates through a fast PCI bus. VIP, neural networks, and the like are particularly well suited for FPGA implementation since a relatively simple processing element (PE) may perform their most basic operations. Consequently, many instances of this PE may be fitted on one FPGA. The VIP architecture is composed of three basic components: the SIMD controller, the matrix of processing elements, and the I/O controller. Those components preferably are connected by a shared global bus and two control buses. The matrix is a set of PEs interconnected in a 2D grid topology.

The same address and control signals are preferably used by every PE. The simple PE interconnection topology is cheap and very efficient for processing 2D data structures such as images. The complexity of the address buses is reduced since the same address is used by every PE. Many useful vector processing algorithms will perform optimally with such a constraint. Alternatively, the addressing of local memory can vary from PE to PE.

The following example illustrates one possible embodiment of multiprocessor 100 of FIG. 1 as a platform for virtual image processing. Multiprocessor 100 has a (2×2) array 102 of FPGAs 104 and processor controller 108 is also an FPGA, where each of the five FPGAs is an SRAM-based Altera EPF81500FPGA. The connection from multiprocessor 100 to the host computer (not shown in FIG. 1) is through a PCI bus interface. Multiprocessor 100 has six memory devices (data memory 110, instruction memory 112, and four local memories 120 for the four FPGAs 104), where each memory device is a 20 ns static-RAM module of 64 K×32 bits. Each FPGA has approximately 16,000 usable gates. I/O controller 106 implementation comprises an EPROM-based EPM7192 EPLD (3,750 usable gates) from Altera Corporation of San Jose, Calif. and an AMCC S5933 PCI controller from Applied Micro Circuits Corporation of San Diego, Calif., and its configuration EPROM.

Since each PE may be configured on-board, the invention may perform any dedicated function by using exactly the logic needed for its implementation. Increasing the number of PEs increases performance. As will be demonstrated later, such an architecture may be an order of magnitude faster than general-purpose processors having the same cost.

The 128-bit vertical torus connections (two 32-bit north connections and two 32-bit south connections) are routed to a 128-pin connector header. Similarly, 128-bit horizontal torus connections (two 32-bit east connections and two 32-bit west connections) are routed to a different 128-pin connector header. Each N-S and E-W torus connection may be established using jumpers. Such connectors may also be used to carry signals off-board for multiple-board processing.

As described earlier, process controller 108 is preferably implemented on an FPGA. This implies that decoding and executing instructions may be different from one application to the other. For example, in a convolution application, both data memory 110 and instruction memory 112 may be used to store large instruction words, while, for a character recognizer, global information may be stored in data memory 110. Once an instruction is decoded, data and control signals are sent to the FPGAs through global bus 114 and program control bus 118. Table I shows the widths of the different buses.

TABLE I

| BUS | NUMBER OF BITS |
|---|---|
| Global bus 114 | 32 bits |
| Three address buses | 18 bits each |

TABLE I-continued

| BUS | NUMBER OF BITS |
|---|---|
| I/O control bus 116 | 23 bits |
| Program control bus 118 | 10 bits |
| 2D grid connections | 32 bits |
| Configuration signals | 8 bits |

When multiple PEs are implemented on a single FPGA, the data and control signals for the FPGA are shared among every PE of that sub-matrix of PEs. For example, in a 2D SIMD implementation, each FPGA may be programmed to function as a 2D sub-matrix of PEs. The FPGA matrix then becomes a single large PE matrix. As shown in FIG. 3, the connections between FPGAs are used for connecting adjacent PEs located on different FPGAs. Architectures that fit into this framework may be implemented by configuring the FPGAs accordingly. For example, since a 1D topology may be mapped on a 2D topology, the VIP board may be configured as a 1D SIMD processor.

The PCI local bus is used for the I/O interface. The PCI local bus standard is widely accepted by the personal computer industry and for its high transfer rate (132 MBytes/sec). The design of the bus interface is greatly simplified by the AMCC S5933 PCI controller. It is a powerful and flexible controller supporting several levels of interface sophistication. The control of the PCI interface chip is provided by an Altera EPM7192 EPROM-based programmable logic device. A 32-bit bus (multiplexed address and data) interconnects those two chips. This bus is connected to the board's global bus through a 32-bit transceiver. This transceiver has three modes: write-to-global bus, read-from-global bus, and disconnect-from-global bus.

Each Altera EPF81500 FPGA is on-line configurable. The reserved configuration pins for all five FPGAs are connected to the EPM7192 device. It is thus possible to configure each FPGA at any time by providing the configuration data from the host computer. All FPGAs may be configured in parallel in less than 40 ms. The on-board local memories 120 are accessible by the SIMD controller and the FPGAs. Therefore, they may be configured before any memory transfer is initiated.

Two clock signals are available on-board. The first one is the 33-MHz PCI bus clock that is provided by the PCI controller, while the second one is an on-board crystal clock. A programmable clock is generated from the EPM7192 device, based on those two clocks. For added flexibility, the crystal clock is preferably mounted on a socket.

It is possible to connect together two or more VIP boards by using their 128-pin connectors. In that case, the N-S connections and/or E-W connections of the FPGAs may be routed to other boards. Some of those connections may be used as control signals to synchronize the execution on a multi-board system. This is greatly simplified by the use of the same PCI clock on each board.

To perform computation on the VIP board initially, the designer determines a program for an application and a dedicated logic design for the SIMD controller and each FPGA. This design is translated into a form that may be used to configure the corresponding FPGAs. This configuration is send to the I/O controller which supervises the configuration of each FPGA. At this point, the SIMD controller and FPGAs have the capability to access each memory bank. Data transfers may be initiated by the host computer. The I/O controller signals the SIMD controller to start program execution. During program execution, status information is transmitted to the I/O controller. SIMD processing is done in parallel to those transmissions. The SIMD controller indicates to the I/O controller that the processing is done. The result of the computation may be read from registers or memories as initiated by the host computer.

The following example demonstrates the implementation of a convolution process over a binary image on a prototype of the VIP board of the present invention. Each pixel $z_{ij}$ in the resulting feature map is expressed as follows:

$$z_{i,j} = \begin{cases} 1 & \text{if } y_{i,j} > t \\ 0 & \text{otherwise} \end{cases}$$

where $$y_{i,j} = \sum_{k=1}^{N} \sum_{n=1}^{M} f(x_{i+k, j+n}, w_{k,n})$$

and $f()$ is any 3-input-bit Boolean function, $x_{ij}$ is a pixel in the original image (precision: 1 bit), $w_{k,n}$ is a template pixel (precision: 2 bits), N and M are respectively the height and width of the template image. Finally, $y_{i,j}$ is the cross correlation between image field and the template and t is threshold level for a match.

For a 2D systolic algorithm, a matrix of 8×4 PEs is implemented on each FPGA, for a total of 16×8 PEs for the (2×2) array of four FPGAs. The systolic algorithm computes 16×8 convolutions in parallel in N×M steps. This is done by partitioning the image in (15+N)×(7+M) pixel tiles. Each tile has 16×8 or 128 convolution results. A tile image is shifted over the PE matrix by using, the North, South, and East connections. The "border" of the sliding window is fed from each PEs' local memory. The template values are broadcasted from the global bus to each PE. At any time, every PE computes a partial sum for its convolution. Reading pixel columns and rows from memory is pipelined with the processing, and an initial latency of 3 cycles is used.

The processing steps for each tile convolution are:

(1) Load a tile (1-cycle/memory read, 3-cycle latency);

(2) N×M computations (1 cycle each);

(3) Threshold function evaluation to generate z() (1 cycle); and (4) Write result (2 cycles/memory write).

Thus, there are N×(M+7) cycles per tile.

The prototype of the VIP board of the present invention had a processing rate of 16.6 MHz for this application. This implementation speed performance was compared to that of the NET32K board. The NET32K board is described in E. Cosatto and H. Graf, "NET32K high speed image understanding system," *Proceedings of the Fourth International Conference on Microelectronics for Neural Networks and Fuzzy Systems,* PP. 413–421, September 1994, the teachings of which are incorporated herein by reference. The same algorithm was also optimized for a personal computer (PC) having an Intel 90-MHz Pentium® processor, 32 MB of main memory, and a 256-KB level-2 cache. Table II shows a performance comparison between these three implementations for convolution over a 512×512 pixel image. The Net32K board was configured to process only templates of size 16×16, which explains why no performance improvement was achieved for smaller templates.

TABLE II

| Template size | VIP board | NET32K board | Pentium-based PC |
|---|---|---|---|
| 3 × 4 | 1.5 ms | 6.25 ms | 114 ms |
| 8 × 8 | 6 ms | 6.25 ms | 238 ms |
| 16 × 16 | 24 ms | 6.25 ms | 961 ms |

The reported performance shows that the prototype VIP board was between 40 and 76 times faster than a 90-MHz Pentium-based PC, depending on template size. For small templates, the VIP board was faster than the NET32K board; however, for larger template, it was 4 times slower. Considering that slow FPGAs and SRAM were used in the VIP prototype of the present invention, those results are very impressive. The VIP board outperformed, in some cases, a dedicated processor. This is a surprising achievement for programmable hardware which is much slower than custom chip implementation. Furthermore, the added flexibility of the VIP board over the NET32K board permits implementation of algorithms that could not be processed by the NET32K board. For example, the VIP board could process images with many levels of gray which is not possible for the NET32K board.

As another application example, the prototype VIP board was programmed as an optical handwritten character recognizer. The program is based on the evaluation of a feedforward neural network, using forward propagation without multiplication. See J. Cloutier and P. Simard, "Hardware implementation of the backpropagation without multiplication," *Proceedings of the Fourth International Conference on Microelectronics for Neural Networks and Fuzzy Systems,* pp. 46–55, September 1994, the teachings of which are incorporated herein by reference. The forward propagation for each unit i, is given by the following equation:

$$x_j = f_j \left( \sum_i w_{ji} x_i \right)$$

where $f$ is the unit function, $w_{ji}$ is the weight from unit i to unit j, and $x_i$ is the activation of unit i. This implementation considers the following resolution and format of neural network variables. The weights are 8-bit fixed-point numbers with 6-bit fractional value. The states are 3-bit floating-point values with 1-bit mantissas (m) and 2-bit exponents (e). The corresponding real numbers are $-1^m \times 2^{-e}$. Each neuron has the same unit function which is a discretized version of a sigmoid function. The output function is a state value as defined above.

Defining the shift-operation (a<<b), where a is a fixed-point number with the same resolution as the weights and b=(m,e) is a floating-point number, yields the following:

$$(a \times b) = (a << b) = -1^m a 2^{-e}$$

which may be implemented by a barrel shifter. The sign inversion is performed by the adder used for the multiply-accumulate operation. This implementation permits reduction of the hardware by about 40% over one using an 8-bit multiplier. This is done without any degradation of recognizer performance.

The character recognition algorithm has five layers. The first layer performs convolutions of four different 5×5 kernels over a 32×32 pixel input image having 3 bits per pixel to generate four feature maps. The second layer subsamples the four feature maps to reduce the resolution of each feature map by four. The third layer performs a set of convolutions (similar to the first layer) by combining different feature maps to generate 12 new maps. The fourth layer performs subsampling similar to the second layer, but on smaller feature maps. The fifth layer is a fully connected neural network connected with 73 outputs corresponding to letters, digits, and punctuation. All weights in the neural network were learned from examples using a back-propagation algorithm. The forward pass algorithm was implemented with a 2D systolic network of 6×6 PEs per FPGA. A square sub-matrix of 8 times 8 performed a shift-accumulate operation and a discretized sigmoid function. The other PEs were used to shift information around. In this implementation, the prototype VIP board performed at a frequency of 16.6 MHz. The processing was time-multiplexed over the layers of the network. Each feature map was diced into tiles that fit into the 12×12 PEs of the 2D systolic network. For example, the 32×32 input was diced into 16 tiles (nine of size 12×12, six of size 12×8, and one of size 8×8). The resulting feature map for a tile was not larger than 8 times 8, since only 8 times 8 convolutions were computed per tile.

Only the first three layers were executed on the VIP board (86% of the connections). The remaining layers, which have higher precision, were computed on the host computer. The total execution time for the three layers is presented in Table III which compares the performance of implementations of the present invention to those of the ANNA board and a dual-processor SPARC 10-41X2 workstation from Sun Microsystems of Mountain View, Calif. Tile ANNA board is described in E. Säckinger, B. E. Boser, J. Bromley, E. LeCun, and L. D. Jackel, "Application of the ANNA neural network chip to high-speed character recognition," *IEEE Trans. on Neural Networks*, 3(3), May 1992 and E. S äckinger and H. Graf, "A system for high-speed pattern recognition and image analysis," *Proceedings of the Fourth International Conference on Microelectronics for Neural Networks and Fuzzy Systems*, pp. 364–371, September 1994, the teachings of both of which are incorporated herein by reference.

TABLE III

| VIP board | ANNA board | SPARC workstation |
|---|---|---|
| 0.75 ms | 1.02 ms | 12.3 ms |

Loading and storing transfer operations were included in the execution time of the VIP board. The VIP board was respectively about 1.4 and 16.4 times faster than the ANNA and SPARC implementations. This is due mainly to the improved parallelism and 2D systolic network that is well suited for processing 2D data structure. For example, at each step of the convolution, 144 state values of 3 bits were exchanged between PEs, giving an impressive bandwidth of 900 MBytes/sec.

The architecture and implementation of the VIP board described above uses large FPGAs as the main building blocks. This provides a high degree of flexibility for the processor logic design. The VIP board has a SIMD "virtual" architecture with a 2D interconnection network that is well suited for implementing 2D systolic networks.

The two implementation examples described above compare the speed performance of the VIP board with other dedicated and general hardware designs. In some situations, the VIP board is at least an order of magnitude faster than general processor implementations. Furthermore, it has speed performance similar to those obtained by dedicated hardware. Such results are excellent, considering that the approach of the present invention is much more general and much cheaper than dedicated hardware. In fact, the initial prototype used the slowest version of the EPF81500 FPGA available at that time from Altera. Using faster chips and faster memory in other implementations of the VIP board may increase performance at least another 2 to 3 times.

Those skilled in the art will understand that the prototype VIP board described in the above examples is only one possible embodiment of the present invention and that many other embodiments fall within the scope of the present invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A multiprocessor comprising:
   (a) a multidimensional array of field programmable gate arrays (FPGAs), each FPGA having local memory;
   (b) a process controller, connected to the array of FPGAs; and
   (c) an input/output (I/O) controller, connected to the array of FPGAs and to the process controller, wherein:
      the array of FPGAs is adapted to be programmed as a matrix of processing elements (PEs), wherein each FPGA in the array corresponds to two or more PEs;
      the process controller is adapted to control processing implemented by the PEs; and
      the I/O controller is adapted to control data flow into and out of the PEs and the process controller.

2. The invention of claim 1, wherein the process controller is an FPGA.

3. The invention of claim 1, wherein the process controller is a single-instruction, multiple-data (SIMD) controller adapted to control parallel processing by the PEs.

4. The invention of claim 1, wherein the multiprocessor is a first multiprocessor adapted to be connected to a second multiprocessor having a multidimensional array of FPGAs, wherein the array of FPGAs of the first multiprocessor is adapted to be connected to the array of FPGAs of the second multiprocessor to form an augmented multidimensional array of FPGAs.

5. The invention of claim 1, further comprising two memories that are independently addressable by the process controller.

6. The invention of claim 5, wherein the two memories comprise an instruction memory adapted to store programming instructions from the process controller and a data memory adapted to receive to store global data from the process controller.

7. The invention of claim I, further comprising:
   (d) a global bus interconnecting and adapted to support data transfer between the array of FPGAs, the process controller, and the I/O controller;
   (e) an I/O control bus interconnecting and adapted to support data transfer between the I/O controller and the process controller;
   (f) a program control bus interconnecting and adapted to support data transfer between the process controller and the array of FPGAs, and
   (g) a host system bus adapted to be interconnected to a computer host to support data transfer between the computer host and the I/O controller.

8. The invention of claim 1, wherein each FPGA is either one-time programmable or reprogrammable.

9. The invention of claim 1, wherein each FPGA is adapted to be programmed to use the same local-memory addresses.

10. The invention of claim 1, wherein at least one FPGA is connected to at least three neighboring FPGAs.

11. The invention of claim 1, wherein the multidimensional array is a two-dimensional (2D) array, wherein each FPGA is connected in north, east, south, and west directions to its four neighboring FPGAs in a torroidal fashion.

12. The invention of claim 1, further comprising:
(d) a global bus interconnecting and adapted to support data transfer between the array of FPGAs, the process controller, and the I/O controller;
(e) an I/O control bus interconnecting and adapted to support data transfer between the I/O controller and the process controller;
(f) a program control bus interconnecting and adapted to support data transfer between the process controller and the array of FPGAs;
(g) instruction memory, connected to the process controller, wherein the process controller is adapted to store programming instructions in the instruction memory; and
(h) data memory, connected to the process controller, wherein the process controller is adapted to store global data in the data memory, wherein:
the instruction memory and the data memory are independently addressable by the process controller;
the process controller is an FPGA adapted to be programmed as a SIMD controller to control parallel processing by the PEs;
each FPGA is either one-time programmable or reprogrammable;
each FPGA is adapted to be programmed to use the same local-memory addresses;
the multidimensional array is a two-dimensional (2D) array, wherein each FPGA is connected in north, east, south, and west directions to its four neighboring FPGAs in a torroidal fashion; and the 2D array of FPGAs is adapted to be programmed as a 2D matrix of PEs.

13. The invention of claim 12, wherein the multiprocessor is a first multiprocessor adapted to be connected to a second multiprocessor having a 2D array of FPGAs, wherein the array of FPGAs of the first multiprocessor is adapted to be connected to the array of FPGAs of the second multiprocessor to form an augmented 2D array of FPGAs.

14. The invention of claim 1, wherein the PEs are programmed with an optical character recognition algorithm functioning to receive data from an optical scanner in the form of pixels and to output character recognition data.

15. The invention of claim 1, wherein the PEs are programmed with an algorithm that comprises at least one of matrix multiplication, matrix addition, vector multiplication, vector addition, convolution, neural network forward pass, and neural network learning.

16. A multiprocessor comprising:
(a) a first FPGA; and
(b) one or more other FPGAs, connected to the first FPGA, wherein:
the first FPGA is adapted to be programmed to function exclusively as a process controller for the one or more other FPGAs; and
the one or more other FPGAs are adapted to be programmed to function exclusively as processing elements.

17. The invention of claim 16, wherein the one or more other FPGAs comprise a multidimensional array of FPGAs adapted to be programmed as one or more processing elements and the first FPGA is adapted to be programmed as a parallel process controller to control parallel processing implemented by the processing elements.

18. A multiprocessor comprising:
(a) a multidimensional array of field programmable gate arrays (FPGAs), each FPGA having local memory;
(b) a process controller, connected to the array of FPGAs; and
(c) an input/output (I/O) controller, connected to the array of FPGAs and to the process controller, wherein:
the array of FPGAs is adapted to be programmed as one or more processing elements (PEs);
the process controller is adapted to control processing implemented by the PEs;
the I/O controller is adapted to control data flow into and out of the PEs and the process controller; and
the PEs are programmed with an optical character recognition algorithm functioning to receive data from an optical scanner in the form of pixels and to output character recognition data.

19. A multiprocessor comprising:
(a) a multidimensional array of field programmable gate arrays (FPGAs), each FPGA having local memory;
(b) a process controller, connected to the array of FPGAs; and
(c) an input/output (I/O) controller, connected to the array of FPGAs and to the process controller, wherein:
the multidimensional array is a two-dimensional (2D) array, wherein each FPGA in the array is directly connected in north, east, south, and west directions to its four neighboring FPGAs in a torroidal fashion;
the array of FPGAs is adapted to be programmed as one or more processing elements (PEs);
the process controller is adapted to control processing implemented by the PEs; and
the I/O controller is adapted to control data flow into and out of the PEs and the process controller.

20. The invention of claim 19, wherein the process controller is an FPGA.

21. The invention of claim 19, wherein the process controller is a single-instruction, multiple-data (SIMD) controller adapted to control parallel processing by the PEs.

22. The invention of claim 19, wherein the multiprocessor is a first multiprocessor adapted to be connected to a second multiprocessor having a multidimensional array of FPGAs, wherein the array of FPGAs of the first multiprocessor is adapted to be connected to the array of FPGAs of the second multiprocessor to form an augmented multidimensional array of FPGAs.

23. The invention of claim 19, further comprising two memories that are independently addressable by the process controller.

24. The invention of claim 23, wherein the two memories comprise an instruction memory adapted to store programming instructions from the process controller and a data memory adapted to receive to store global data from the process controller.

25. The invention of claim 19, further comprising:
(d) a global bus interconnecting and adapted to support data transfer between the array of FPGAs, the process controller, and the I/O controller;
(e) an I/O control bus interconnecting and adapted to support data transfer between the I/O controller and the process controller;

(f) a program control bus interconnecting and adapted to support data transfer between the process controller and the array of FPGAs; and (g) a host system bus adapted to be interconnected to a computer host to support data transfer between the computer host and the I/O controller.

26. The invention of claim 19, wherein each FPGA is either one-time programmable or reprogrammable.

27. The invention of claim 19, wherein each FPGA is adapted to be programmed to use the same local-memory addresses.

28. The invention of claim 19, wherein at least one FPGA is connected to at least three neighboring FPGAs.

29. The invention of claim 19, wherein the array of FPGAs is adapted to be programmed as a matrix of PEs.

30. The invention of claim 29, wherein each PE corresponds to one or more FPGAs.

31. The invention of claim 29, wherein each FPGA corresponds to one or more PEs.

32. The invention of claim 19, further comprising:

(d) a global bus interconnecting and adapted to support data transfer between the array of FPGAs, the process controller, and the I/O controller;

(e) an I/0 control bus interconnecting and adapted to support data transfer between the I/0 controller and the process controller;

(f) a program control bus interconnecting and adapted to support data transfer between the process controller and the array of FPGAs;

(g) instruction memory, connected to the process controller, wherein the process controller is adapted to store programming instructions in the instruction memory; and (h) data memory, connected to the process controller, wherein the process controller is adapted to store global data in the data memory, wherein:

the instruction memory and the data memory are independently addressable by the process controller;

the process controller is an FPGA adapted to be programmed as a SIMD controller to control parallel processing by the PEs;

each FPGA is either one-time programmable or reprogrammable;

each FPGA is adapted to be programmed to use the same local-memory addresses; and the 2D array of FPGAs is adapted to be programmed as a 2D matrix of PEs.

33. The invention of claim 32, wherein the multiprocessor is a first multiprocessor adapted to be connected to a second multiprocessor having a 2D array of FPGAs, wherein the array of FPGAs of the first multiprocessor is adapted to be connected to the array of FPGAs of the second multiprocessor to form an augmented 2D array of FPGAs.

34. The invention of claim 19, wherein the PEs are programmed with an optical character recognition algorithm functioning to receive data from an optical scanner in the form of pixels and to output character recognition data.

35. The invention of claim 19, wherein the PEs are programmed with an algorithm that comprises at least one of matrix multiplication, matrix addition, vector multiplication, vector addition, convolution, neural network forward pass, and neural network learning.

* * * * *